United States Patent
Egri et al.

(10) Patent No.: US 9,306,607 B2
(45) Date of Patent: Apr. 5, 2016

(54) WIDEBAND INTERFERENCE MITIGATION SYSTEM WITH NEGATIVE GROUP DELAY AND METHOD FOR WIDEBAND INTERFERENCE CANCELLATION

(71) Applicant: Raytheon BBN Technologies Corp., Cambridge, MA (US)

(72) Inventors: Robert Gyorgy Egri, Carlisle, MA (US); Jonathan P. Comeau, Winchester, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 171 days.

(21) Appl. No.: 14/057,731

(22) Filed: Oct. 18, 2013

(65) Prior Publication Data
US 2015/0050904 A1  Feb. 19, 2015

Related U.S. Application Data

(60) Provisional application No. 61/866,630, filed on Aug. 16, 2013.

(51) Int. Cl.
  *H04B 1/10* (2006.01)
  *H04B 1/12* (2006.01)
(52) U.S. Cl.
  CPC .................................... *H04B 1/123* (2013.01)
(58) Field of Classification Search
  USPC ......... 455/296, 303, 304, 305, 306, 307, 310, 455/311
  See application file for complete search history.

(56) References Cited

U.S. PATENT DOCUMENTS 6,529,719 B1 *  3/2003  Imbornone et al. ........... 455/302
8,090,332 B2 *  1/2012  Sahota et al. ................. 455/130
(Continued)

FOREIGN PATENT DOCUMENTS

WO   WO-2012/050257 A2   4/2012

OTHER PUBLICATIONS

"Great Britian Application Serial No. GB1413580.0, Search Report mailed Nov. 26, 2014", 3 pgs.
(Continued)

*Primary Examiner* — Blane J Jackson
(74) *Attorney, Agent, or Firm* — Schwegman Lundberg & Woessner, P.A.

(57) ABSTRACT

Embodiments of a wideband interference mitigation (IM) system with negative group delay (NGD) compensation and method for wideband interference cancellation are generally described herein. In some embodiments, the wideband IM system may include first frequency-selective circuitry to capture interfering signals within a bandwidth of interest from a primary signal path after removal of a desired signal, cancellation circuitry to implement a negative group delay (NGD) on output signals from the first frequency-selective circuitry to generate negative group-delayed signals, and second frequency-selective circuitry to generate interference cancellation signals from the negative group-delayed signals for combining with signals from the primary signal path. The negative group delay provided by the cancellation circuitry may compensate for a group delay of the first frequency-selective circuitry, a group delay of the second frequency-selective circuitry and a group delay of primary signal path so that the interference cancellation signals have little or no group delay with respect to signals of the primary signal path within the bandwidth of interest.

16 Claims, 3 Drawing Sheets

(56) References Cited

U.S. PATENT DOCUMENTS

| | | | |
|---|---|---|---|
| 8,489,056 B2 * | 7/2013 | Wyville | 455/280 |
| 8,594,603 B2 * | 11/2013 | Balankutty et al. | 455/296 |
| 8,644,786 B2 * | 2/2014 | Mirzaei et al. | 455/318 |
| 2004/0062216 A1 * | 4/2004 | Nicholls et al. | 370/320 |
| 2005/0127996 A1 | 6/2005 | Jelonnek et al. | |
| 2010/0260076 A1 * | 10/2010 | Corman et al. | 370/277 |
| 2013/0149982 A1 | 6/2013 | Wyville | |

OTHER PUBLICATIONS

Ayazian, S., et al., "Feedforward Interference Cancellation in Radio Receiver Front-Ends", *IEEE Transactions on Circuits and Systems II: Express Briefs*, 54(10), (2007), 902-906.

Bode, Hendrik W., *Network Analysis and Feedback Amplifier Design*, Tenth Printing, D. Van Nostrand Company, Inc., New York, NY, (1945), 565 pgs.

Jeong, Y., et al., "Experimental verification for time advancement of negative group delay in RF electronic circuits", *Electronics Letters*, 46(4), (2010), 306-307.

Nightingale, S. J., "An Eight Channel Interference Cancellation System", *IEEE MTT-S International Microwave Symposium Digest*, 2, (2006), 914-917.

Noto, Hifumi, et al., "Negative Group Delay Circuit for Feed-Forward Amplifier", *International Microwave Symposium, MIT-S*, (2007), 1103-1106.

* cited by examiner

FIG. 4A $$H(s) = \frac{R_4}{R_4+R_3} \frac{s^2 + \left[\frac{1}{R_2}\left(\frac{1}{C_2}+\frac{1}{C_1}\right) - \frac{R_3}{R_4}\frac{1}{R_1C_2}\right]s + \frac{1}{R_1C_1R_2C_2}}{s^2 + \frac{1}{R_2}\left(\frac{1}{C_2}+\frac{1}{C_1}\right)s + \frac{1}{R_1C_1R_2C_2}}$$

WIDEBAND INTERFERENCE MITIGATION SYSTEM WITH NEGATIVE GROUP DELAY AND METHOD FOR WIDEBAND INTERFERENCE CANCELLATION

PRIORITY CLAIM

This application claims priority under 35 USC 119 to U.S. Provisional Patent Application Ser. No. 61/866,630, filed Aug. 16, 2013 which is incorporated herein by reference in its entirety.

TECHNICAL FIELD

Embodiments pertain to wideband receivers and radio-frequency (RF) receiver front ends. Some embodiments relate to active interference cancellation of multiple high-power interference sources. Some embodiments relate to electronic evisceration of interference signals.

BACKGROUND

Conventional active interference mitigation techniques are generally implemented after a low-noise amplifier (LNA) of a receiver's front end due to, among other things, noise-figure and insertion loss requirements. These conventional techniques are problematic particularly when dealing with multiple high-power interference signals over a wide band. For example, multiple high-power interference signals may cause an LNA to produce intermodulation and cross modulation interference distorting the desired signal making it difficult to sufficiently cancel the interfering signals.

Thus, what is needed is a wideband interference mitigation system and method for wideband interference cancellation that is more effective at mitigating multiple high-power interference signals. What is also needed is a wideband interference mitigation system and method for wideband interference cancellation that is suitable for implementation before the LNA in a receiver's front end.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figures 1, 2A:
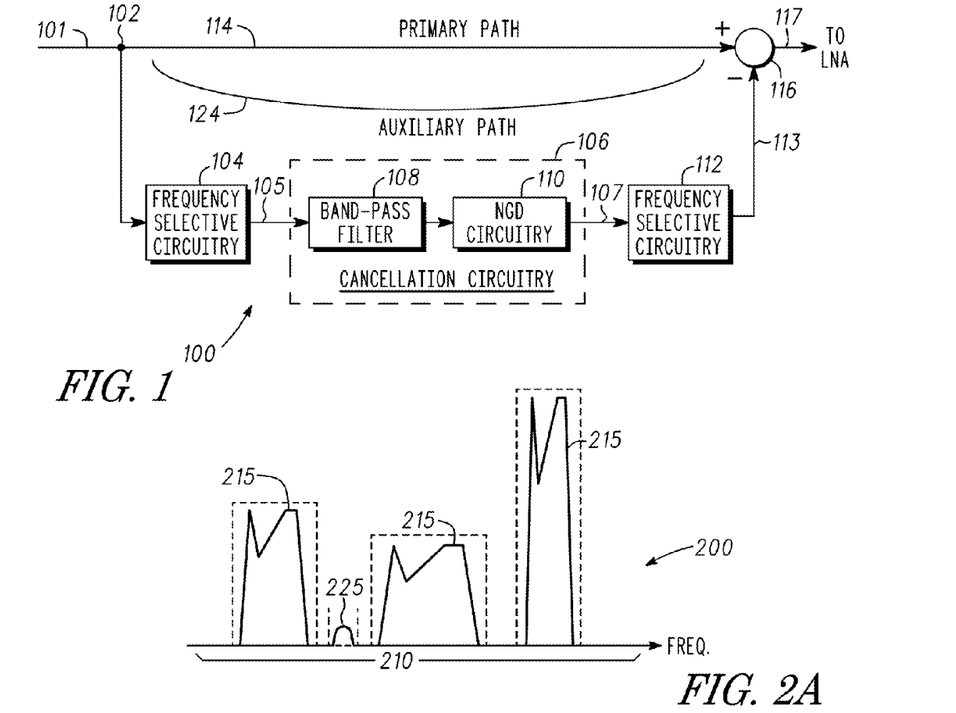
FIG. 1 illustrates a wideband interference-mitigation (IM) system in accordance with some embodiments.
FIG. 2A illustrates an example input signal spectrum for the wideband IM system of FIG. 1.

FIG. 1 illustrates a wideband interference mitigation (IM) system in accordance with some embodiments. Wideband IM system 100 may be part of a wideband receiver and may be arranged to provide interference-mitigated signals to the wideband receiver's front end circuitry such as a low-noise amplifier (LNA). The wideband IM system 100 may be more effective at mitigating one or more high-power interference signals than many conventional systems and may be suitable for implementation before a LNA in a receiver's front end.

In accordance with embodiments, the wideband IM system 100 may use negative group delay (NGD) compensation for interference mitigation. In these embodiments, the wideband IM system 100 may include first frequency-selective circuitry 104 to capture interfering signals within a bandwidth of interest from a primary signal path 114 after removal of a desired signal. The wideband IM system 100 may also include cancellation circuitry 106 to implement a negative group delay on the output signals 105 from the first frequency-selective circuitry 104 to generate negative group-delayed signals 107. The wideband IM system 100 may also include second frequency-selective circuitry 112 to generate interference cancellation signals 113 from the negative group-delayed signals 107 for combining with the signals from the primary signal path 114. In these embodiments, the negative group delay provided by the cancellation circuitry 106 may be selected to compensate at least for the group delay of the first frequency-selective circuitry 104, the group delay of the second frequency-selective circuitry 112 and any group delay of primary signal path 114 so that the interference cancellation signals 113 have little or no (i.e., approximately zero) group delay with respect to signals of the primary signal path 114 within the bandwidth of interest. In these embodiments, the interference cancellation signals 113 may be generated to have the proper amplitude and phase to cancel the interference when injected into the primary signal path 114 or when combined with signals in the primary signal path 114.

Unlike many conventional active interference cancellation techniques that rely on narrowband phase alignment, embodiments of the present invention directly synthesize and realize a near-zero group delay band-pass structure placed in an auxiliary signal path 124. In these embodiments, the interference spectrum can be aligned in phase over a broader band because the primary and auxiliary signal paths are aligned in terms of group delay. In these embodiments, phase alignment may be restricted to a finite spectral band occupied by the interference, but at the same time the primary and auxiliary signal paths may have completely different gross propagation delays altogether. The group delays of these paths may be aligned in a restricted band so that both their carrier phases and envelopes can be aligned. Outside that frequency band they do not need to be aligned either in time (envelope) or in phase (carrier).

In accordance with embodiments, the term 'group delay' refers to a measure of the time-delay of the amplitude envelopes of the various sinusoidal components of a signal and is a function of frequency for each sinusoidal component. Group delay effectively adds a phase ramp proportional to the frequency deviation from the center frequency. In accordance with embodiments, the interference cancellation signals 113 are generated to have little or no group delay with respect to signals of the primary signal path 114 within the bandwidth of interest to achieve sufficient phase tracking for interference cancellation. To achieve a 20 dB rejection at least between one to three degrees of phase tracking is generally required. To achieve +/−3 degrees of phase accuracy over a 100 MHz band, embodiments of the present invention may provide no more than about a one-hundred pico-second maximum average group delay error over the 100 MHz band (i.e., little or no group delay difference between the paths).

FIG. 2A illustrates an example input signal spectrum for the wideband IM system 100 (FIG. 1). The input signal spectrum 200 may include one or more interference signals 215 (i.e., interferers) and a desired signal 225. These signals may correspond to the signals present at RF input 101 (FIG. 1) which may represent an antenna port. The one or more interference signals 215 and the desired signal 225 may be within a bandwidth of interest 210 and may be received by one or more antennas.

Figure 2B:
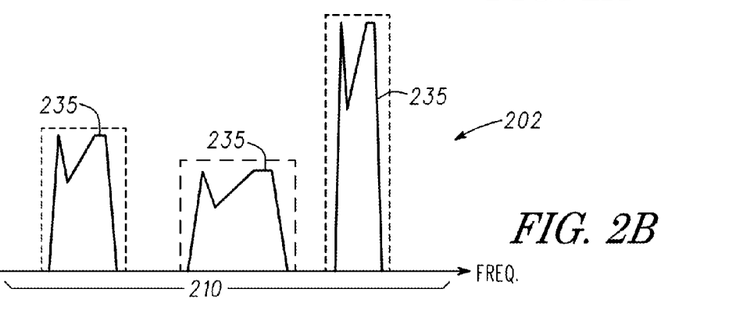
FIG. 2B illustrates the example pre-cancellation signal spectrum 202 of the wideband IM system of FIG. 1.

FIG. 2B illustrates the example pre-cancellation signal spectrum 202 of the wideband IM system 100 (FIG. 1). After the removal of the desired signal 225 (FIG. 2A), the interference signals 215 are operated on and interference cancellation signals 235 (corresponding to interference cancellation signals 113 (FIG. 1)) are generated for injection into the primary signal path 114.

Figure 2C:
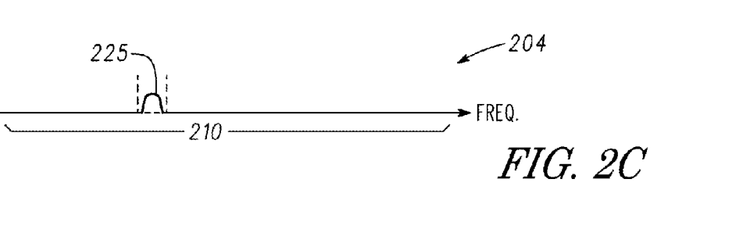
FIG. 2C illustrates an example output signal spectrum of the wideband IM system of FIG. 1.

FIG. 2C illustrates an example output signal spectrum 204 of the wideband IM system 100 (FIG. 1). After injection of the interference cancellation signals 235 (FIG. 2B) into the primary signal path 114, only the desired signal 225 may remain in the bandwidth of interest 210.

In accordance with some embodiments, the first frequency-selective circuitry 104 may capture the interfering signals 215 (FIG. 2A) within the bandwidth of interest 210 from the primary signal path 114 after removal of a desired signal 225. The cancellation circuitry 106 may implement a negative group delay on output signals 105 from the first frequency-selective circuitry 104 to generate negative group-delayed signals 107, and the second frequency-selective circuitry 112 may generate the interference cancellation signals 235 from the negative group-delayed signals 107 for combining with signals from the primary signal path 114.

In these embodiments, the desired signal 225 (FIG. 2A) may be eliminated from the auxiliary signal path 124 (e.g., with a band-stop filter) and the cancellation circuitry 106 may filter one or more of the several high-level interference signals 215 individually, which may then be individually reconstructed with the same amplitude and same phase before being subtracted from the composite input signal. In some embodiments, the high-level interference signals 215 may be individually reconstructed with the same amplitude and opposite phase before being added to the composite input signal.

In the illustrated embodiments, the first frequency-selective circuitry 104, the second frequency-selective circuitry 112, and the cancellation circuitry 106 may be part of auxiliary signal path 124 (i.e., the cancellation path). In these embodiments, if the primary signal path 114 is electrically short, the auxiliary signal path 124 may be configured to have approximately zero group delay within the bandwidth of interest 210 (e.g., a bandwidth in which the interfering signals 215 are present).

In some embodiments, the cancellation circuitry 106 may include band-pass filter circuitry 108 cascaded with negative group delay (NGD) compensation circuitry 110. In some embodiments, the cancellation circuitry 106 may include a frequency selective band-pass circuit arranged to have a group delay with a predetermined negative or positive value.

In some embodiments, the cancellation circuitry 106 may comprise a band-pass filter cascaded with a band-stop filter. The band-stop filter may be a band-stop group delay compensator. The band-pass filter circuitry 108 may have a positive group delay within the bandwidth of interest 210 and the band-stop filter may have a negative group delay over the bandwidth of interest 210. The negative group delay of the band-stop filter may compensate at least for the positive group delay of the band-pass filter circuitry 108 and positive group delay of both the first frequency-selective circuitry 104 and the second frequency-selective circuitry 112. In some embodiments, the band pass and band stop filters may be interchanged.

In some embodiments, the band-pass filter circuitry 108 may be a Cauer (i.e., elliptic function) band-pass filter. In these embodiments, the band-pass filter circuitry 108 has a positive group delay and the NGD compensation circuitry 110 has a negative group delay over at least a large portion of the band-pass region of the band-pass filter circuitry 108. In some embodiments, the band-pass filter circuitry 108 may be a Chebyshev II filter, although the scope of the embodiments is not limited in this respect. The number of poles of the band-pass filter circuitry 108 may range from as little as three to up to seven or more.

In some embodiments, the band-stop filter may be arranged to remove the desired signal 225 prior to the band-pass filter operating on the interfering signals. In these embodiments, the band-pass filter may prevent the desired signal 225 from being injected into the negative group delay compensation circuitry 110.

Figure 3:
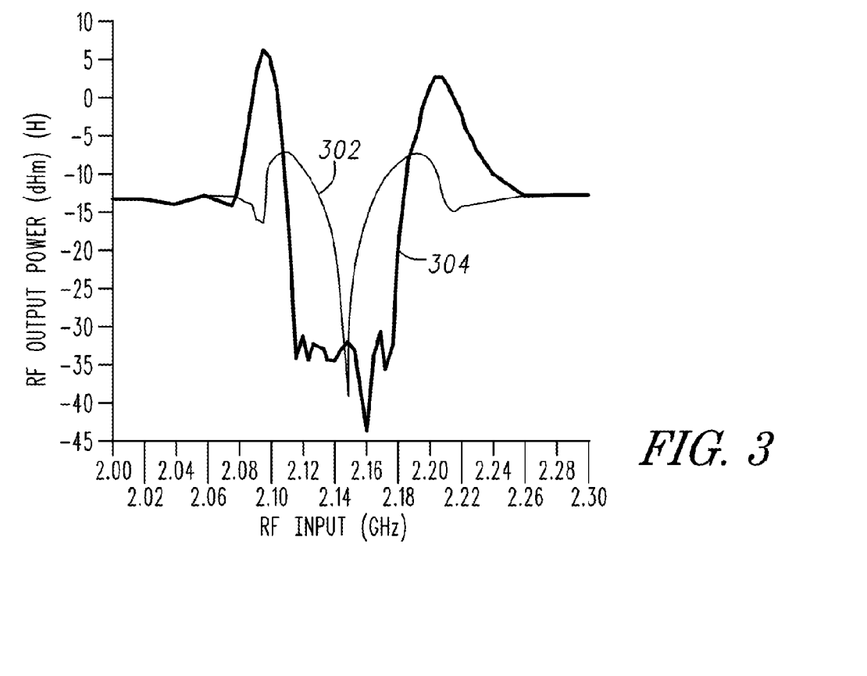
FIG. 3 is a comparison of example responses between that of a conventional IM system and an IM system in accordance with some embodiments.

FIG. 3 is a comparison of example responses between that of a conventional system and a system in accordance with some embodiments. As illustrated in FIG. 3, conventional system response 302 is for a system without NGD compensation and system response 304 is for a system that implements NGD compensation for interference mitigation as discussed above. In the illustration of FIG. 3, the interference may occupy the band 2.11 GHz-2.18 GHz (70 MHz) (e.g., a bandwidth of interest) and the desired signal is either below 2.1 GHz or above 2.26 GHz. Within the bandwidth of interest, a uniformly greater than 20 dB of cancellation may be achieved by a system implementing NGD, such as wideband IM system 100 (FIG. 1). This amount of interference cancellation may be sufficient for most LNA/mixer combinations (e.g., provided in the signal path after the wideband IM system 100) to remain in their linear regime.

Figure 4A:
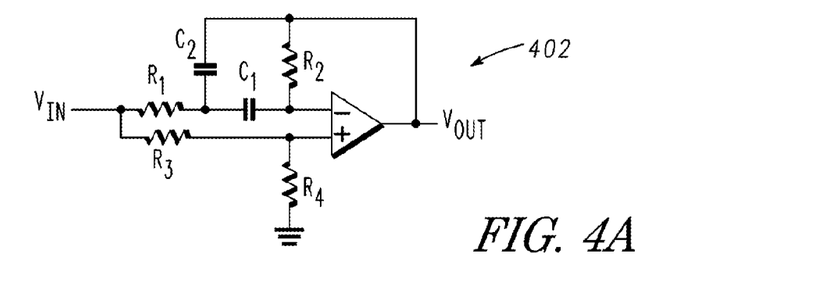
FIG. 4A illustrates a single active bi-quad in accordance with some embodiments.
Figure 4B:
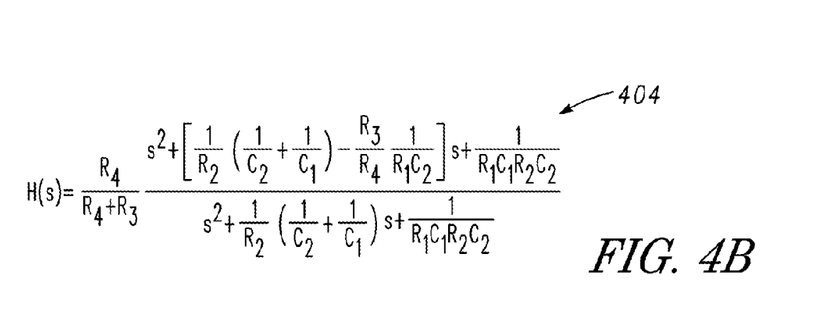
FIG. 4B illustrates a transfer function of the active bi-quad of FIG. 4A.

FIG. 4A illustrates a single active bi-quad in accordance with some embodiments. In some embodiments, the negative group delay compensation circuitry 110 (FIG. 1) may comprise cascades of active bi-quads 402 arranged to implement a negative group delay transfer function although the scope of the embodiments is not limited in this respect. In these embodiments, resistive and capacitive values of the active bi-quads 402 may be selected to obtain the proper amount of negative group delay, bandwidth and selectivity. FIG. 4B illustrates a transfer function 404 of a single active bi-quad 304. Other techniques and circuitry for implementing and synthesizing a NGD transfer function may also be used.

One possible direct synthesis realization is by noting that the reciprocal transfer function of any minimum-phase shift transfer function is also realizable. A minimum phase shift transfer function H(s) is one that has neither poles nor zeros on the right half plane Re$\{s\}>0$. Now if H(s) is both band-pass and minimum phase shift then its 1/H(s) reciprocal is also minimum phase shift has band-stop character. The phase of 1/H(i$\omega$) is always the opposite of H(i$\omega$) hence the former's group delay is the negative of H(i$\omega$). In other words, in the region where the group delay of $H(i\omega)$ is positive the group delay of $1/H(i\omega)$ is negative. This consideration is valid for both active and passive realizations, and needs only that the transfer function possesses the minimum phase shift property.

In some embodiments, the band-pass filter circuitry 108 (FIG. 1) may also comprise cascades of active bi-quads 402 to implement a band-pass structure, although this is not a requirement. In some other embodiments, the band-pass filter circuitry 108 may comprise passive circuitry.

Referring back to FIG. 1, in some embodiments, the first-frequency-selective circuitry 104 may be configurable to dynamically capture at least one of a plurality of interference signals 215 within the bandwidth of interest 210. The second frequency-selective circuitry 112 may be arranged to generate the interference cancellation signals 113 to dynamically cancel at least one of the interference signals 215. In some of these embodiments, the bandwidth of interest 210 maybe several octaves, (e.g., 2 GHz to 12 GHz, or more) within which there may be several bands of high intensity interfering signals 215 (FIG. 2A). As discussed above, in one of the gaps between the bands of interfering signals 215, the desired signal 225 to be received may be present.

In some of these embodiments, the interfering signals 215 and the desired signal 225 may be variable in both frequency and bandwidth. In these embodiments, dynamic filtering may be performed to remove the desired signal 225 from the auxiliary signal path 124, and the frequency-selective circuitry 104, 112 may be dynamically responsive to control signals from the receiver to capture a particular interferer. Accordingly, high power interferers may be cancelled before they can saturate the LNA/mixer of the receiver and thereby distort the desired signal with intermodulation. In some embodiments, the interfering signals 215 may be jamming signals or jammers.

In some embodiments, the first frequency-selective circuitry 104 may comprise first image-rejection mixer circuitry arranged to selectively down-convert one of the interfering signals 215. The second frequency-selective circuitry 112 may include second image rejection mixer circuitry to up-convert the group-delayed signals 107 to generate interference cancellation signals for one of the interfering signals 215. In these embodiments, the second frequency-selective circuitry 112 may be arranged to reconstruct the interfering signals captured from the primary signal path 114 without the desired signals 225 for out-of-phase injection back into the primary signal path 114.

The local-oscillator (LO) signals that may be used by the image rejection mixer circuitry may be tunable and may be selected to be either above or below the frequency of the interference. The use of image-rejection mixer circuitry reduces any image noise and allows for increased tunability. In some alternate embodiments, instead of image-rejection mixer circuitry, tunable filters may be used.

In accordance with some embodiments, the LO signals provided to the first image-rejection mixer circuitry and the LO signals provided to the second image-rejection mixer circuitry are coherent and generated from the same reference oscillator. Amplifiers in the second image-rejection mixer circuitry may be arranged so that the reconstructed signals (i.e., interference cancellation signals 113) are of the same amplitude as the interference signals in the primary signal path 114 at the point of injection/cancellation. In some embodiments, to reduce the amount of oscillator phase noise injected back at the cancellation point, notch filters tuned to a frequency corresponding to that of the desired signal may be used on the LO inputs to the second image-rejection mixer circuitry.

In some embodiments, the wideband IM system 100 may also include a coupler 116 to combine the interference cancellation signals 113 with RF signals of the primary signal path 114 to generate an interference mitigated output signal 117 for subsequent amplification by a low-noise amplifier (LNA) (not illustrated) and processing within a wideband receiver. The coupler 116 may, for example, be either an active voltage combiner or an active current combiner. In some embodiments, the coupler 116 may be passive directional coupler.

In some embodiments, signals provided to the first frequency-selective circuitry 104 may be extracted from the primary signal path 114 at signal extraction point 102. In some embodiments, a passive directional coupler may be used to couple signals to the first frequency-selective circuitry 104 from the primary signal path 114 to the auxiliary signal path 124. In other embodiments, instead of a passive directional coupler, signals may be directly extracted at signal extraction point 102 and a high-impedance amplifier, such as a transconductance amplifier (TCA), may be used. In other embodiments, instead of a passive directional coupler, an active voltage coupler or active current coupler may be used.

In some embodiments, the cancellation circuitry 106 may also take into account any additional group delay associated with the primary signal path 114 between signal extraction point 102 and signal injection point at coupler 116 so that the group delay of the interference cancellation signals 113 has the same group delay as the RF signals between the signal extraction point 102 and the signal injection point.

Figure 5:
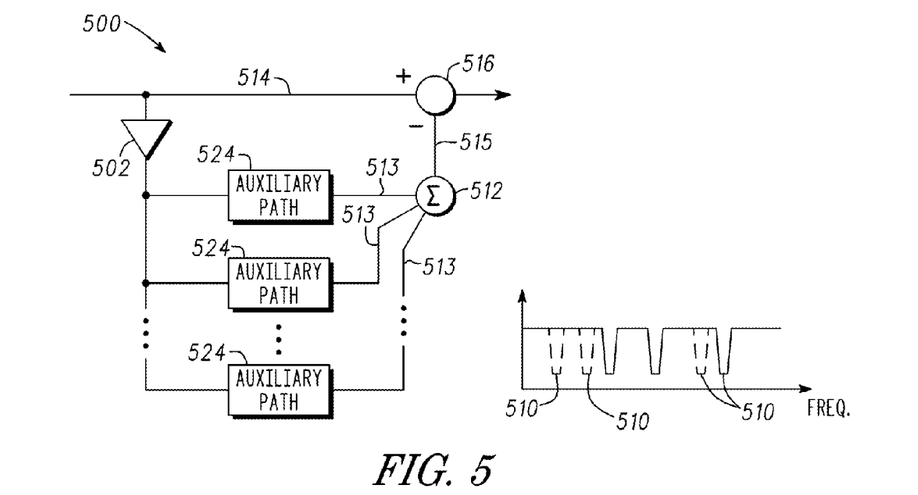
FIG. 5 illustrates a multi-band embodiment of a wideband IM system including wideband tunable notches in accordance with some embodiments.

FIG. 5 illustrates a multi-band embodiment of a wideband IM system including wideband tunable notches in accordance with some embodiments. In these embodiments, wideband IM system 500 may include a plurality of auxiliary signal paths 524 (FIG. 5) arranged in parallel. Each auxiliary signal path 524 may be arranged to generate interference cancellation signals 513 for one of a plurality of interference signals 215 (FIG. 2A). Each auxiliary signal path 524 may be arranged to implement NGD compensation on a selected one of the interference signals 215. In some embodiments, each auxiliary signal path 524 may include first frequency-selective circuitry such as first frequency-selective circuitry 104 (FIG. 1), cancellation circuitry such as cancellation circuitry 106 (FIG. 1), and second frequency-selective circuitry such as second frequency-selective circuitry 112 (FIG. 1).

In these embodiments, the wideband IM system 500 may also include circuitry 512 to combine the plurality of interference cancellation signals 513 to generate a composite interference cancellation signal 515. The wideband IM system 500 may also include circuitry 516 to combine the composite interference cancellation signal 515 with signals in the primary signal path 514 to mitigate interference before further signal processing in the wideband receiver.

In some embodiments, each auxiliary signal path 524 may generate interference cancellation signals 513 inducing a wideband tunable notch 510 in the primary signal path 514, one for each of the plurality of wideband interferences 215. Not only are the notches 510 widely tunable by the heterodyne construction but because of the group delay compensation they are wideband when compared to the conventional designs which in principle only work for an infinitely narrow band (i.e., a single frequency).

In some embodiments, wideband IM system 500 may also include TCA 502 to extract signals from the primary signal path 514 and provide the extracted signals to each of the auxiliary signal paths 524. The TCA 502 may provide a high impedance at the extraction point. In some embodiments, a signal splitter may be used prior to each of the auxiliary signal paths 524.

Figure 6:
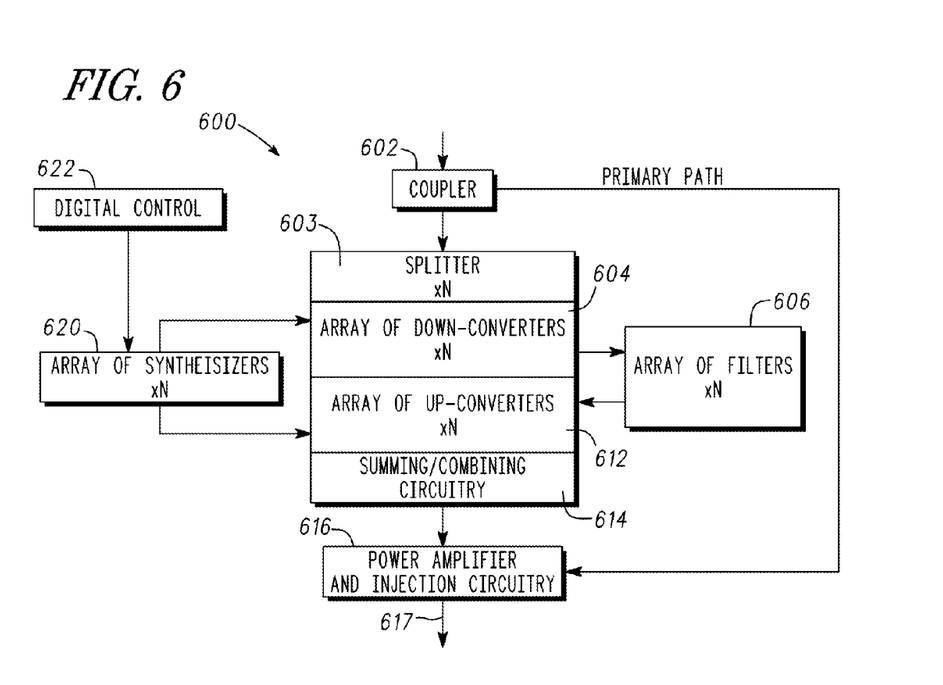
FIG. 6 illustrates another multi-band embodiment of a wideband IM system in accordance with some embodiments.

FIG. 6 illustrates another multi-band embodiment of a wideband IM system in accordance with some embodiments. In these embodiments, wideband IM system 600 may include a coupler 602 or other circuitry to extract signals from the primary signal path and a splitter 603 to provide a signal to each of a plurality of auxiliary signal paths. The array of auxiliary signal paths that comprise an array of downconverters 604. Each downconverter 604 may be arranged to capture one of the interference signals and may operate similarly to first frequency-selective circuitry 104 (FIG. 1). The auxiliary signal paths may also include an array of frequency selective filters 606 to implement a zero or near zero group delay filtering on each of the captured interference signals. The frequency selective filters 606 may operate similarly to cancellation circuitry 106 (FIG. 1). The auxiliary signal paths may also include an array of upconverters 612 to generate the interference cancellation signals from the NGD signals for summing and/or combining by summing/combining circuitry 614 and injection into the primary signal path by power amplifier and injection circuitry 616. Each upconverters 612 may operate similarly to second frequency-selective circuitry 112 (FIG. 1).

As illustrated in FIG. 6, the wideband IM system 600 may also include an array of synthesizers 620 to generate LO signals for the array of downconverters 604 and the array of upconverters 612 for a selected one of the interference signals. The wideband IM system 600 may also include a controller 622 to configure the array of synthesizers 620 and the array of filters 606 for interference mitigation.

Although the wideband IM system 100 (FIG. 1), the wideband IM system 500 (FIG. 5), and the wideband IM system 600 (FIG. 6) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wideband interference-mitigation (IM) system comprising:
    circuitry to implement a negative group delay (NGD) on interfering signals in an auxiliary signal path that are extracted from a primary signal path after removal of a desired signal; and
    circuitry to generate interference cancellation signals from the negative group-delayed signals for combining with signals of the primary signal path,
    wherein the negative group delay is to compensate for a group delay of the auxiliary signal path to minimize any group delay that the interference cancellation signals have with respect to signals of the primary signal path within a bandwidth of interest,
    wherein the primary signal path is configured without a delay element or delay line between the extraction of signals for the auxiliary signal path and the combining of the interference cancellation signals with the signals of the primary signal path,
    wherein the circuitry to implement the NGD comprises cancellation circuitry comprising band-pass filter circuitry cascaded with and coupled directly to NGD compensation circuitry, and
    wherein the band-pass filter circuitry has a positive group delay within the bandwidth of interest and the NGD compensation circuitry has negative group delay within the bandwidth of interest configured so that the interference cancellation signals have little or no group delay with respect to signals of the primary signal path within the bandwidth of interest.

2. The wideband IM system of claim 1 wherein the primary signal path comprises RF signals received directly from an antenna without prior amplification by a low noise amplifier (LNA), and
    wherein the interference cancellation signals are combined with the RF signals of the primary signal path to generate an interference-mitigated output signal for subsequent amplification by a LNA.

3. The wideband IM system of claim 2, wherein the wideband IM system is part of a wideband receiver, and
    wherein the wideband IM system further comprises first frequency-selective circuitry to capture the interfering signals within the bandwidth of interest from the primary signal path after removal of the desired signal,
    wherein the cancellation circuitry is to implement the NGD on output signals from the first frequency-selective circuitry to generate the negative group-delayed signals,
    wherein the circuitry to generate interference cancellation signals comprises second frequency-selective circuitry to generate the interference cancellation signals from the negative group-delayed signals for combining with signals from the primary signal path, and
    wherein the negative group delay provided by the cancellation circuitry is selected to compensate for a group delay of the first frequency-selective circuitry, a group delay of the second frequency-selective circuitry and a group delay of primary signal path so that the interference cancellation signals have little or no group delay with respect to signals of the primary signal path within the bandwidth of interest.

4. The wideband IM system of claim 2 further comprising a coupler to combine the interference cancellation signals with RF signals of the primary signal path to generate an interference mitigated output signal for subsequent amplification by the LNA and processing within a wideband receiver,
 wherein the coupler is either an active voltage combiner or an active current combiner.

5. The wideband IM system of claim 1 wherein the first-frequency-selective circuitry is configurable to dynamically capture at least one of a plurality of interference signals within the bandwidth of interest, and
 wherein the second frequency-selective circuitry is arranged to generate the interference cancellation signals to dynamically cancel at least one of the interference signals.

6. A wideband interference-mitigation (IM) system comprising:
 circuitry to implement a negative group delay (NGD) on interfering signals in an auxiliary signal path that are extracted from a primary signal path after removal of a desired signal; and
 circuitry to generate interference cancellation signals from the negative group-delayed signals for combining with signals of the primary signal path,
 wherein the negative group delay is to compensate for a group delay of the auxiliary signal path to minimize any group delay that the interference cancellation signals have with respect to signals of the primary signal path within a bandwidth of interest,
 wherein the circuitry to implement the NGD comprises cancellation circuitry,
 wherein the cancellation circuitry comprises a band-pass filter cascaded with and coupled directly to a band-stop filter, the band-stop filter operates as a band-stop group delay compensator, and
 wherein the band-pass filter has a positive group delay within the bandwidth of interest and the band-stop filter has negative group delay over the bandwidth of interest, the negative group delay of the band-stop filter arranged to compensate at least for the positive group delay of the band-pass filter circuitry and positive group delay of both first frequency-selective circuitry and second frequency-selective circuitry provided in the auxiliary signal path.

7. The wideband IM system of claim 6 wherein a combination of the band-pass filter and the group delay compensating band-stop filter is arranged to remove the desired signal prior to the band-pass filter operating on the interfering signals.

8. A wideband interference-mitigation (IM) system comprising:
 circuitry to implement a negative group delay (NGD) on interfering signals in an auxiliary signal path that are extracted from a primary signal path after removal of a desired signal; and
 circuitry to generate interference cancellation signals from the negative group-delayed signals for combining with signals of the primary signal path,
 wherein the negative group delay is to compensate for a group delay of the auxiliary signal path to minimize any group delay that the interference cancellation signals have with respect to signals of the primary signal path within a bandwidth of interest,
 wherein the circuitry to implement the NGD comprises cancellation circuitry, the cancellation circuitry comprising band-pass filter circuitry cascaded with and coupled directly to NGD compensation circuitry, and
 wherein the NGD compensation circuitry comprises cascades of active bi-quads arranged to implement a negative group delay (NGD) transfer function.

9. A wideband interference-mitigation (IM) system comprising:
 circuitry to implement a negative group delay (NGD) on interfering signals in an auxiliary signal path that are extracted from a primary signal path after removal of a desired signal; and
 circuitry to generate interference cancellation signals from the negative group-delayed signals for combining with signals of the primary signal path,
 wherein the negative group delay is to compensate for a group delay of the auxiliary signal path to minimize any group delay that the interference cancellation signals have with respect to signals of the primary signal path within a bandwidth of interest,
 wherein the primary signal path comprises RF signals received directly from an antenna without prior amplification by a low noise amplifier (LNA), and
 wherein the interference cancellation signals are combined with the RF signals of the primary signal path to generate an interference-mitigated output signal for subsequent amplification by a LNA,
 wherein the wideband IM system is part of a wideband receiver,
 wherein the wideband IM system further comprises first frequency-selective circuitry to capture the interfering signals within the bandwidth of interest from the primary signal path after removal of the desired signal,
 wherein the circuitry to implement the NGD comprises cancellation circuitry to implement the NGD on output signals from the first frequency-selective circuitry to generate the negative group-delayed signals,
 wherein the circuitry to generate interference cancellation signals comprises second frequency-selective circuitry to generate the interference cancellation signals from the negative group-delayed signals for combining with signals from the primary signal path,
 wherein the negative group delay provided by the cancellation circuitry is selected to compensate for a group delay of the first frequency-selective circuitry, a group delay of the second frequency-selective circuitry and a group delay of primary signal path so that the interference cancellation signals have little or no group delay with respect to signals of the primary signal path within the bandwidth of interest,
 wherein the cancellation circuitry includes band-pass filter circuitry cascaded with negative group delay (NGD) compensation circuitry, and
 wherein the wideband IM system further comprises a plurality of auxiliary signal paths arranged in parallel, each auxiliary signal path arranged to generate interference cancellation signals for one of a plurality of interference signals,
 each auxiliary signal path arranged to implement NGD compensation on a selected one of the interference signals, and
 wherein the wideband IM system further comprises:
 circuitry to combine the plurality of interference cancellation signals to generate a composite interference cancellation signal;

circuitry to combine the composite interference cancellation signal with signals in the primary signal path to mitigate interference before further signal processing in the wideband receiver; and transconductance amplifier (TCA) to extract signals from the primary signal path and provide the extracted signals to each of the auxiliary signal paths.

10. The wideband IM system of claim 5 wherein the first frequency-selective circuitry comprises first image-rejection mixer circuitry arranged to selectively down-convert one of the interfering signals; and
  wherein the second frequency-selective circuitry includes second image rejection mixer circuitry to up-convert the group-delayed signals to generate the interference cancellation signals for one of the interfering signals,
  wherein the second frequency-selective circuitry is arranged to reconstruct the interfering signals captured from the primary signal path without the desired signals for out-of-phase injection back into the primary signal path.

11. The wideband IM system of claim 9 wherein the auxiliary signal paths comprise:
  an array of downconverters, each to capture one of the interference signals;
  an array of frequency selective filters to implement a zero or near zero group delay filtering on each of the captured interference signals; and
  an array of upconverters to generate the interference cancellation signals from the NGD signals for combining and injection into the primary signal path,
  wherein the wideband IM system further comprises:
  an array of synthesizers to generate LO signals for the array of downconverters and the array of upconverters for a selected one of the interference signals; and
  a controller to configure the array of synthesizers and the array of filters for interference mitigation.

12. A method for wideband interference cancellation comprising:
  implementing a negative group delay (NGD) on interfering signals in an auxiliary signal path that are extracted from a primary signal path after removal of a desired signal; and
  generating interference cancellation signals from the negative group-delayed signals for combining with signals of the primary signal path,
  wherein the primary signal path is configured without a delay element or delay line between the extraction of signals for the auxiliary signal path and the combining of the interference cancellation signals with the signals of the primary signal path,
  wherein the NGD in the auxiliary path is implemented by cancellation circuitry comprising band-pass filter circuitry cascaded with and coupled directly to NGD compensation circuitry,
  wherein the band-pass filter circuitry has a positive group delay within the bandwidth of interest and the NGD compensation circuitry has negative group delay within the bandwidth of interest, and
  wherein the negative group delay is to compensate for positive group delay within the auxiliary signal path to minimize any difference in group delay that the interference cancellation signals have with respect to signals of the primary signal path within the bandwidth of interest.

13. The method of claim 12 wherein the primary signal path comprises RF signals received directly from an antenna without prior amplification by a low noise amplifier (LNA), and
  wherein the method further comprises combining the interference cancellation signals with the RF signals of the primary signal path to generate an interference-mitigated output signal for subsequent amplification by a LNA.

14. A wideband receiver comprising:
  a wideband interference-mitigation (IM) system to implement a negative group delay (NGD) on interfering signals in an auxiliary signal path that are extracted from a primary signal path after removal of a desired signal and to generate interference cancellation signals from the negative group-delayed signals for combining with signals of the primary signal path;
  circuitry to combine the interference cancellation signals with RF signals of the primary signal path to generate an interference mitigated output signals; and
  a low noise amplifier (LNA) to amplify the interference mitigated output signals for subsequent processing,
  wherein the primary signal path is configured without a delay element or delay line between the extraction of signals for the auxiliary signal path and the combining of the interference cancellation signals with the signals of the primary signal path,
  wherein the NGD in the auxiliary path is implemented by cancellation circuitry comprising band-pass filter circuitry cascaded with and coupled directly to NGD compensation circuitry,
  wherein the band-pass filter circuitry has a positive group delay within the bandwidth of interest and the NGD compensation circuitry has negative group delay within the bandwidth of interest, and
  wherein the negative group delay is to compensate for positive group delay within the auxiliary signal path to minimize any difference in group delay that the interference cancellation signals have with respect to signals of the primary signal path within the bandwidth of interest.

15. The wideband receiver of claim 14 wherein the primary signal path comprises RF signals received directly from an antenna without prior amplification by a LNA.

16. The wideband receiver of claim 14 wherein the band-pass filter circuitry is cascaded with and coupled directly to the NGD compensation circuitry.

* * * * *